Dec. 19, 1967   J. LIPINSKI   3,358,774
METHOD AND APPARATUS FOR REGULATING THE DEPTH
OF PENETRATION OF A TRACTOR-DRAWN PLOUGH
Filed Jan. 19, 1965   5 Sheets-Sheet 4

United States Patent Office 3,358,774
Patented Dec. 19, 1967

3,358,774
METHOD AND APPARATUS FOR REGULATING THE DEPTH OF PENETRATION OF A TRACTOR-DRAWN PLOUGH
Johann Lipinski, Vienna, Austria, assignor to Alex. Friedmann Kommandit-Gesellschaft, Vienna, Austria
Filed Jan. 19, 1965, Ser. No. 428,015
Claims priority, application Austria, Jan. 20, 1964,
A 396/64
31 Claims. (Cl. 172—1)

ABSTRACT OF THE DISCLOSURE

A method and an apparatus for regulating the depth of penetration of a plough drawn by a tractor that has an internal combustion engine with fuel injection, in dependence on the amount per time unit of fuel delivered to the engine. The pressure of the fuel in a fuel carrying chamber of the injection pump serves as a regulating valve, said pressure of the fuel constituting a measure of the amount of fuel delivered to the engine.

---

When a field is being ploughed to a large depth, the depth of penetration of the plough should be as large as possible. This depth of penetration is limited by the power of the tractor. As various parts of the soil differ in hardness, the plough can be utilized only with a low depth of penetration, at which the power of the tractor is not utilized, unless special means are provided for regulating the depth of penetration in dependence on the soil conditions. It is already known to regulate the depth of penetration of the plough in dependence on the traction resistance encountered by the plough. The vertical movement of the plough is controlled by hydraulic means which cause the plough to be lifted and lowered in a simple manner. In order to lift and lower the plough in dependence on the resistance presented to the plough by the soil, it has already been suggested to control the vertical movement of the plough in dependence on the tractive effort between the tractor and the plough. In these known arrangements, a dynamometric spring is interposed in the linkage and the length variations of this spring are utilized to control the vertical movement of the plough. If the entire tractive effort or a large part of it is transmitted by the dynamometer, very large forces result, which involve a heavy and complicated structure. There is the additional disadvantage that such large forces have an adverse effect on the sensitivity of the regulation. If only a small part of the tractive effort is utilized, a distorted regulation results and the control apparatus may become entirely useless at a small depth of penetration of the plough.

It is an object of the invention to avoid this disadvantage with tractors provided with internal-combustion engines with fuel injection. Thus, the invention relates to a method for regulating the depth of penetration of a hydraulically controlled plough drawn by a tractor having an internal-combustion engine with fuel injection, said regulation being effected in dependence on the tractive effort applied. The regulating method according to the invention resides in that the depth of penetration of the plough is controlled in dependence on the delivery rate of the fuel injection pump of the drive motor of the tractor, an increase of the delivery rate resulting in a control of the vertical movement of the plough in the lifting sense and a decrease of the delivery rate resulting in a vertical movement of the plough in the lowering sense. The ideal regulation of the depth of penetration is such that the power of the drive motor of the tractor is fully utilized during deep ploughing. This power is indicated by the delivery rate of the fuel injection pump. A control of the depth of penetration of the plough in dependence on the delivery rate of the fuel injection pump of the tractor is thus the closest approximation to the ideal regulation of the depth of penetration of the plough. When the control is derived from a dynamometer interposed in the traction elements, only the traction resistance of the plough can be taken into account for the control. On the other hand, a control derived from the delivery rate of the fuel injection pump can also take all other variables affecting the power into account. When the tractor is going uphill, the power required for the movement of the tractor itself is larger than during a level movement. When the tractor is going downhill, more power is left for pulling the plough. On soft soil, the resistance to the movement of the tractor is larger than on hard soil so that the power available for pulling the plough is smaller. All these factors are taken into account in the regulating method according to the invention so that the optimum performance of the plough can be achieved during deep ploughing. Furthermore, the fact that the vertical movement of the plough is controlled in dependence on the delivery rate of the fuel injection pump results in a damping of the control. The control is not responsive to a rapid, temporary increase of the traction resistance, when such increased resistance can still be overcome by the tractor. The control does not become operative until the delivery rate of injection pump is increased to overcome such resistance. During a regulation in dependence on the tractive effort between the plough and the tractor, very great forces are transmitted by the dynamometer so that a highly expensive structure is required. On the other hand, the delivery rate can be determined in a simple manner and utilized for the regulation.

The regulation can be derived from the instantaneous delivery rate of the injection pump in various ways. Whereas actual delivery rate of the injection pump may be measured, this would require a complicated measuring device. The regulation may be derived from the position of those control means which determine the delivery rate, e.g., from the position of the regulating rod. The present invention utilizes the fact that the known injection pumps operate usually with a by-pass control.

The working chambers adjacent to the pistons of the injection pumps are entirely filled with fuel during the suction stroke and the fuel injection rate is varied by opening the by-pass conduit at an earlier or later time of the pressure stroke so that fuel is by-passed at a larger or smaller rate from the working chamber adjacent to the piston of the injection pump. Such injection pumps are usually provided with oblique control edges. This by-pass rate is inversely proportional to the delivery rate and is thus an indication of the instantaneous delivery rate of the fuel injection pump. In single-flow injection pumps, the fuel flows through the by-pass conduits into the suction chamber or into a chamber communicating with this suction chamber. In dual-flow injection pumps, the fuel flows through the by-pass conduits into a separate by-pass chamber, from which the fuel enters a return conduit. According to the invention, the discharge of the surplus fuel delivered by the forepump in single-flow injection pumps and the discharge from the by-pass chamber of dual-flow injection pumps may be throttled and the vertical movement of the plough may be controlled in dependence on the pressure in the suction chamber or on the pressure in the by-pass chamber of the injection pump. According to another method according to the invention, the vertical movement of the plough may be controlled in dependence on the velocity of flow of the fuel, more particularly, of the fuel delivered by the forepump of single-flow injection pumps and of the diverted fuel in dual-flow injection pumps. Because the injection pump delivers more fuel to the motor when the same is operating at a high power, the velocity of flow of the fuel between the forepump and the suction chamber is increased in the case of single-flow injection pumps whereas the velocity of flow in the by-pass chamber is reduced. The regulation may readily be derived from these flows.

In all these cases, the apparatus for carrying out such a regulating method is very simple and may be compact and light in weight because large forces are not involved, different from a control derived from a dynamometer.

An apparatus for carrying out the method, in which the control is derived from the pressure, is essentially characterized in that in the injection pump operating with a by-pass control, that fuel chamber into which the fuel which is not injected flows from the pump cylinders communicates with a throttle, the working chamber adjacent to a pressure-controlled piston which is responsive to the fuel pressure used for the control is connected to the fuel-conducting space between the said fuel chamber and the throttle, in which space said fuel pressure used for the control prevails, and the control of the vertical movement of the plough is derived from the adjustment of this piston. The fuel pressure from which the control is derived must be subjected to variations in dependence on the instantaneous delivery rate of the fuel injection pump or of the fuel by-pass rate from the injection pump cylinders in order to enable the control. This is ensured by the throttle, which prevents an undesired equalization of pressure. The smaller the fuel injection rate of the injection pump, the larger is the fuel by-pass rate from the injection pump cylinders and the higher is the pressure used for the control. On the other hand, the fuel pressure from which the control is derived will be lowered when the delivery rate of the fuel pump is increased so that the fuel by-pass rate is reduced.

Within the scope of the invention, these pressure variations in the fuel-conducting space may be rendered effective by various methods. In single-flow injection pumps, in which a feeder supplies the fuel in a transfer conduit to the suction chamber of the injection pump, the throttle may be incorporated according to the invention in a return conduit, which is connected to the transfer conduit and serves for discharging the surplus fuel delivered by the feeder, the working chamber adjacent to the pressure-controlled piston being connected to the fuel-conducting space between the suction chamber and the throttle. Because the surplus fuel is discharged through a predetermined throttle area from the chamber which receives fuel from the feeder, the pressure in this chamber will be increased when the delivery rate of the fuel injection pump is reduced and the pressure in this chamber will be reduced when the delivery rate of the injection pump is increased. In order to emphasize these pressure variations which take place in the fuel-conducting space and are utilized for the regulation, and thus to render the regulation more sensitive, an additional throttle may be interposed according to the invention in such an arrangement in the transfer conduit between the feeder and the connection to the working chamber adjacent to the pressure-controlled piston and before the connection of the return conduit. This additional throttle has the effect of preventing an equalization of pressure in the suction chamber as a result of the by-passing of fuel. In single-flow injection pumps, the arrangement according to the invention may be such that a throttle is arranged only in the transfer conduit between the feeder and the suction chamber of the injection pump, and the working chamber adjacent to the pressure-controlled piston communicates with the fuel-conducting space between this throttle and the suction chamber. This throttle causes any change of the rate of fuel by-passed into the suction chamber to result in a pressure change, which is applied to the pressure-controlled piston and is thus utilized for the regulation.

In single-flow injection pumps a discharge conduit is connected to the by-pass chamber and returns the by-passed fuel to the fuel tank. In the known dual-flow injection pumps the fuel flows off through this discharge conduit without restriction. The invention teaches to incorporate the throttle in the discharge conduit of such a duel-flow injection pump and to connect the working chamber adjacent to the pressure-controlled piston to the fuel-conducting space between this by-pass chamber and the throttle. As the throttle restricts the discharge of fuel from the by-pass chamber, a higher by-pass rate, i.e., a lower delivery rate of the injection pump, will result in an increase of the pressure before the throttle, whereas a lower by-pass rate, i.e., a higher delivery rate of the injection pump, will result in a reduced pressure and constitute a useful control parameter.

The arrangement is such that an increase in the delivery rate of the injection pump, i.e., an increase of the power demand of the engine beyond a certain value, will be indicated by a decrease of the fuel pressure which is utilized for the control so that the plough will be lifted. That value of the pressure used for the control at which the plough is lifted is dependent on the area of the throttle. This area may be pre-adjusted for a certain load range. In any case, the area of the throttle must be adjusted in accordance with the type of the tractor and the type of the injection pump. One throttle is sufficient to meet this basic requirement. According to the invention, this throttle may be replaced by two throttles, namely, a fixedly adjustable throttle for matching the control apparatus to a basic adjustment and another throttle, which is arbitrarily adjustable during operation and serves for an arbitrary change of the load range. This arbitrarily adjustable throttle enables an adjustment of the injection rate at which the lifting of the plough is initiated and of the depth of furrow in dependence on the power of the motor. Alternatively, the working chamber adjacent to the pressure-controlled piston or the supply conduit leading to this working chamber may be connected according to the invention by an arbitrarily operated valve to the return conduit. By this valve, the fuel pressure required for the control may be suddenly reduced so that the plough is entirely lifted out of the soil.

In the simplest embodiment of the invention, the pressure-controlled piston itself may constitute a control piston for the hydraulic system of the lifting mechanism of the plough, and this control piston may perform its control stroke in response to the variations of the fuel pressure used for the control, so that the hydraulic system is controlled in accordance therewith. Alternatively, the pressure-controlled piston may constitute an auxiliary control piston, which controls a pressure fluid for operating the hydraulic control piston. In this case, a relatively small stroke of the pressure-controlled piston may result in a relatively large stroke of the control piston for controlling the hydraulic system of the lifting gear of the plough so that the response rate of the control is increased. The pressure fluid may be an existing pressure fluid, namely, pressure oil, fuel diverted from the hydraulic system of the lifting gear of the plough, or surplus fuel delivered by the forepump. As the forepump is usually feeding surplus fuel, this will in any case be diverted from the fuel before the same enters the fuel-conducting space which communicates with the suction chamber of the injection pump.

The fuel pressure used for controlling the pressure-controlled piston may be admitted to the working chamber adjacent to an auxiliary piston, which is biased towards said working chamber by a spring and controls the area of a throttle that connects the working chamber adjacent to the pressure-controlled piston to the return conduit. This preceding auxiliary piston increases the rate of action of the pressure changes on the pressure-controlled piston so that the control of the vertical movement of the plough begins more rapidly.

Preferred embodiments of the invention will now be described with reference to the accompanying drawings, in which.

Figure 1:
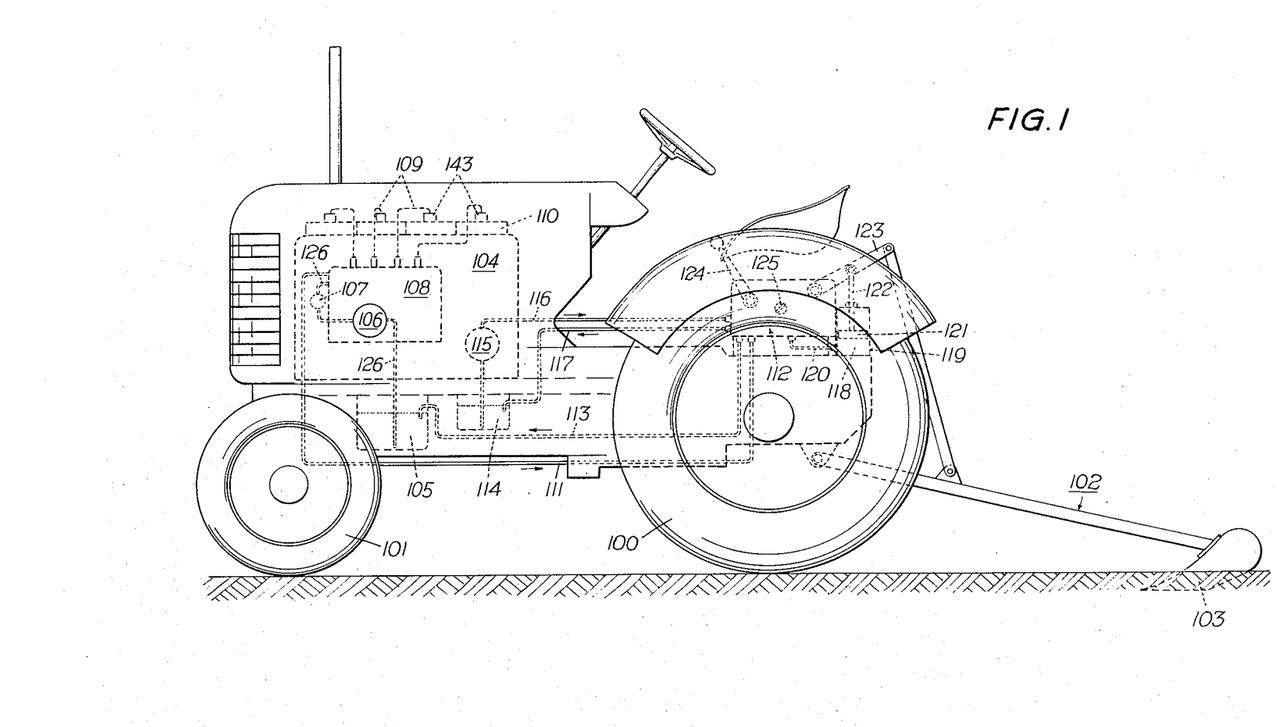
FIG. 1 shows a tractor and a plough provided with an apparatus according to the invention for regulating the depth of penetration of the plough.

As is shown in FIG. 1, the tractor has rear wheels 100 and front wheels 101 and is coupled to a plough 102, which has a ploughshare 103. The tractor is driven by a diesel engine 104. Fuel for the diesel engine is fed by a fuel pump 106 from a fuel tank 105 through a conduit 126 and a fuel filter 107 to an injection pump 108. The filter 107 is provided in most cases with an overflow valve. The injection pump 108 discharges the fuel through injection conduits 109 to each of the injection nozzles, through which the fuel is injected into the cylinders 110 of the engine. The fuel which is not injected but diverted from the injection pump is fed through a conduit 111 to a control apparatus 112, which will be described in more detail hereinafter. From this apparatus, the fuel returns through a conduit 113 into the fuel tank 105. At a suitable point, which will be defined more exactly hereinafter, one of the fuel conduits incorporates a throttle, which causes pressure variations in the conduit 113 to be set up in response to changes in the injection rate. These variations are utilized in the control apparatus 112 for a control of the depth of penetration of the plough 102.

The control apparatus 112 controls a hydraulic cycle which controls in turn the lifting and lowering of the plough. The hydraulic system liquid is fed by a pump 115 from a tank 114 through a conduit 116 to the control apparatus 112. A return conduit 117 for the hydraulic system liquid leads from the control apparatus 112 back to the tank 115. Another conduit 120 leads from the apparatus 112 to the working chamber 118 of the working cylinder 119. The working cylinder 119 contains a piston 121, which is provided with a piston rod 122. That end of the piston rod 122 which is remote from the piston is pivoted to the lifting linkage 123 of the plough 102. An upward movement of the piston 121 will thus effect a lifting movement of the ploughshare 103 whereas a downward movement of the piston 121 will lower the ploughshare 103 deeper into the ground.

In the control apparatus 112, the conduit 116 is connected to the return conduit 117 and the conduit 120 is shut off, or the conduit 116 is connected to the conduit 120 or the conduits 116 and 120 are connected to the return conduit 117. When the control apparatus 112 connects the conduit 116 to the return conduit 117 and the conduit 120 and the working chamber 118 of the working cylinder 119 are shut off, the plough remains in its position. When the conduit 116 is connected to the conduit 120, there will be a pressure rise in the working chamber 118 of the working cylinder 119 so that the piston 121 ascends and the plough 102 is lifted. When the conduit 120 is connected to the return conduit 117, the working chamber 118 of the working cylinder 119 will be pressure-relieved and the piston 121 will descend so that the plough is lowered under the action of gravity into the soil to be cultivated. A lever 124 or a screw 125 enables an adjustment of the depth of penetration of the plough under certain soil conditions and a keeping of the plough in a lifted condition, e.g., for road travel.

Figure 2:
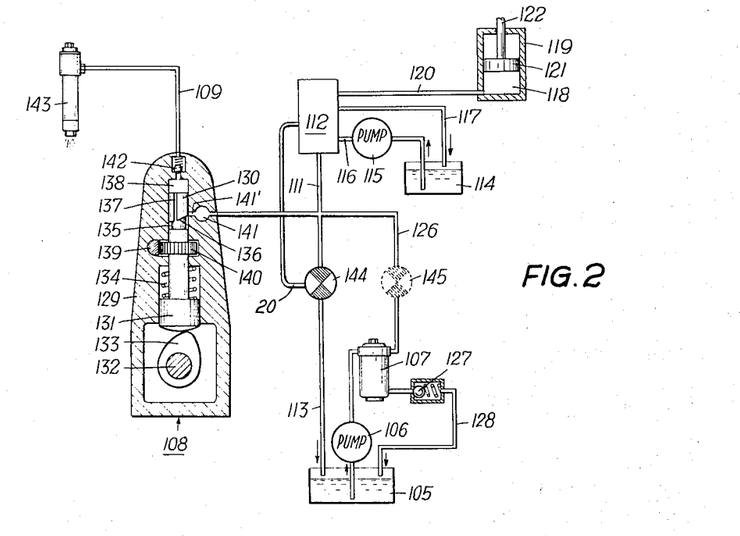
FIGS. 2 and 3 are diagrammatic views showing two different arrangements applied to single-flow injection pumps.

In the diagram shown in FIG. 2, fuel for the tractor is fed by the fuel pump 106 from the fuel tank 105 through the conduit 126 to the injection pump 108. The conduit 126 incorporates again a fuel filter 107, which is connected to an overflow valve 127, through which the surplus fuel fed by the fuel pump 106 is diverted through a conduit 128 to the fuel tank 105. The injction pump 108 comprises a pump housing 129, which incorporates pistons 130 corresponding in number to the cylinders of the engine. The pistons 130 are driven by cams 133, mounted on the camshaft 132, through the intermediary of plungers 131. A spring 134 returns the piston 130 and prevents a disengagement of the plunger 131 from the cam 133. The piston 130 has a groove 135, which has an oblique top edge 136. This groove 135 is connected by a groove 137 to the working chamber 138 of the injection pump. To set the fuel injection rate, the pump pistons 130 are rotated by a displacement of the control rack 139, which coacts with toothed control members 140. The control members 140 are connected to the piston 130 so that they are displaceable in the longitudinal direction of the piston but non-rotatable relative to it. The fuel fed by the fuel pump 106 flows into the suction chamber 141 of the injection pump 108 and during the ascent of the piston 130 is fed through discharge valves 142 and the injection conduits 109 to the injection nozzles 143, through which the fuel is injected into the respective cylinders 110 (not shown) of the engine. In the single-flow injection pump shown in FIG. 2, the fuel is fed to the injection nozzles 143 until the oblique top edge 136 of the groove 135 opens the bore 141', which connects the suction chamber 141 to the working chamber 138, so that the latter is pressure-relieved. A rotation of the piston 130 by means of the rack 139 enables a change of the time when the bore 141' is opened and the feeding of fuel is terminated.

The rack 139 is controlled by a governor of the centrifugal type of well-known, conventional construction, that keeps constant the selectively variable predetermined rotational speed. This type of regulation by governor is usual in connection with tractors for ploughs. (Cf. Rusconi Patent No. 2,629,306, col. 3, lines 40 et seq.).

The conduit 111 leading to the control apparatus 112 and the conduit 113 leading back to the fuel tank 105 are connected in this embodiment to the fuel conduit 126 between the suction chamber 141 and the filter 107. The conduit 113 incorporates a throttle 144, through which the surplus fuel fed by the fuel pump 106 flows into the fuel tank 105.

When fuel is being fed at a relatively high rate through the injection conduits 109 to the engine, fuel will be returned at a lower rate in the suction chamber 141 of the injection pump 108. When fuel is being fed at a relatively low rate through the injection conduits 109 to the engine, fuel will be returned at a higher rate into the suction chamber 141 of the injection pump. When the throttle 144 is set in accordance with the delivery rate of the fuel pump 106, pressure variations depending on the delivery rate of the injection pump 108 will be obtained in the suction chamber 141 and in the conduit 126 between the suction chamber 141 and the filter 107. These pressure variations are utilized in the control apparatus 112. The conduit 126 may incorporate an additional throttle 145, which causes only a part of the fuel fed by the fuel pump 106 to enter the conduit 126 whereas the remainder is discharged through the overflow valve 127 and the conduit 128 into the fuel tank 105. Due to this throttle, stronger pressure variations are obtained in the conduit 126 and in the suction chamber 141 of the injection pump 108.

Figure 3:
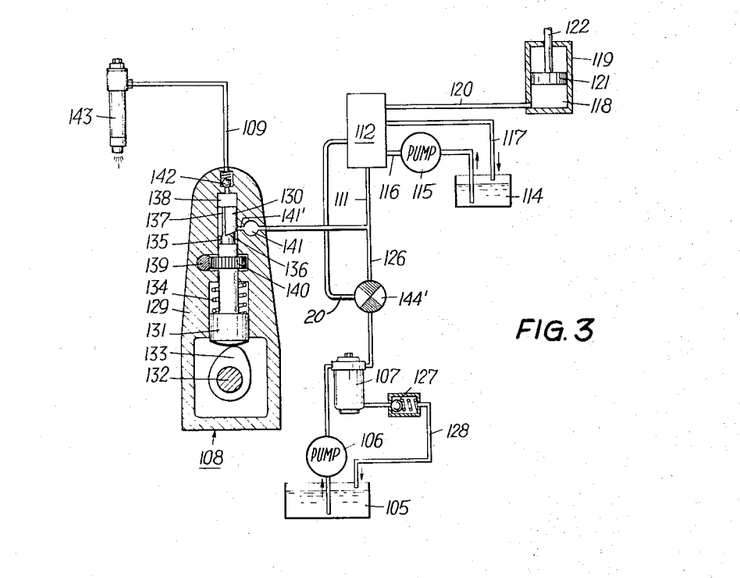

FIG. 3 shows diagrammatically another arrangement of the control apparatus 112 as applied to a single-flow injection pump. The method of operation is exactly like that of the injection pump shown in FIG. 2 and described with reference thereto. In this case the throttle 144' is incorporated in the conduit 126 behind the fuel filter 107, and the conduit 111 leading to the control apparatus 112 is branched from the conduit 126 betweeen the throttle 144' and the suction chamber 141 of the injection pump 108. The filter 107 is connected to the overflow valve 127, through which the surplus fuel fed by the fuel pump 106 is returned via the conduit 128 to the fuel tank 105. In dependence on the delivery rate of the injection pump 108, pressure variations are obtained in the conduit 126 between the suction chamber 141 of the injection pump 108 and the throttle 144' and are applied through the conduit 111 to the control apparatus 112. Again, the pressure in the conduit 126 between the throttle 144' and the suction chamber 141 will drop at a relatively high delivery rate of the injection pump 108 and will rise at a low delivery rate of said injection pump 108.

Figure 4:
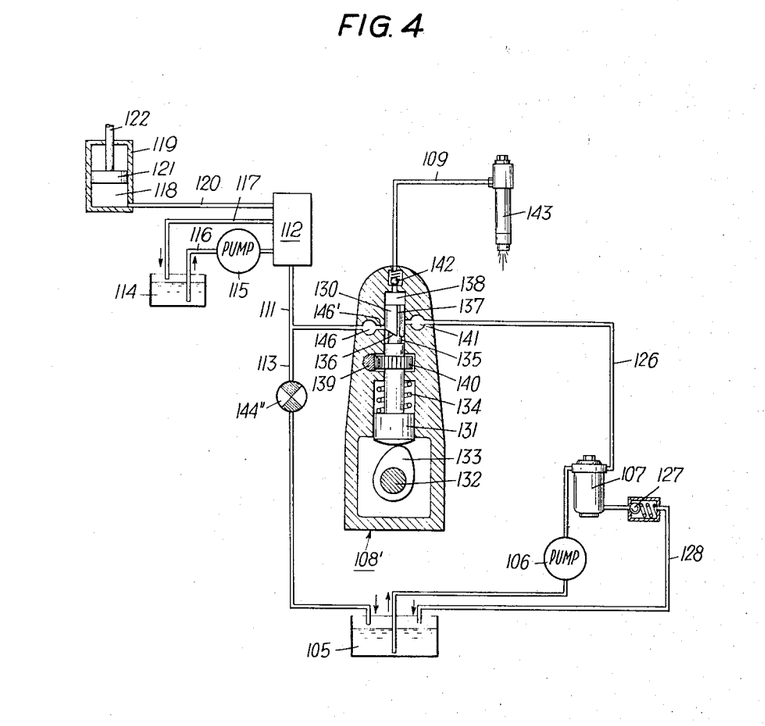
FIG. 4 is a diagrammatic view showing an arrangement applied to dual-flow injection pumps.

FIG. 4 shows diagrammatically the arrangement of the control apparatus 112 with a dual-flow injection pump 108'. Fuel for the diesel engine flows in this case from the fuel tank 105 through the fuel pump 106 and the conduit 126 to the suction chamber 141 of the injection pump 108'. The conduit 126 incorporates again a filter 107, which is connected to an overflow valve 127, which diverts the surplus fuel fed by the fuel pump 106 through the conduit 128 to the fuel tank 105. The fuel pump 108' comprises also pistons 130, which are driven by plungers 131 operated by cams 133, which are mounted on the camshaft 132. The spring 134 returns the piston and prevents a disengagement of the plunger from the cam. The fuel injection rate is again set by a rotation of the piston 130 by means of a rack 139, which co-acts with the toothed control member 140. In the dual-flow injection pump the piston 130 has also a groove 135 formed with an oblique top edge 136. This groove communicates through a groove 137 with the working chamber 138 of the injection pump. During the suction stroke of the piston 130, the fuel flows from the suction chamber 141 into the working chamber 138. During the pressure stroke of the piston 130, the fuel flows through the discharge valves 142 and the injection conduits 109 to the injection nozzles 143, through which the fuel is injected into the respective engine cylinders (not shown). The dual-flow injection pump shown in FIG. 4 comprises a separate overflow chamber 146, which is connected by a bore 146' to the working chamber 138 of the injection pump. The bore 146' is opened by the oblique top edge 136 of the groove 135 so that the working chamber 138 is pressure-relieved and the fuel still contained in this working chamber 138 flows through the groove 137, the groove 135 and the bore 146' into the overflow chamber 146. The time when the bore 146' is opened and the injection is terminated may again be adjusted by a change of the angular position of the piston by the rack 139. From the overflow chamber 146, the fuel is returned through the conduit 113 to the fuel tank 105. The conduit 113 incorporates a throttle 144". The conduit 111 leading to the control apparatus 112 is connected to the conduit 113 at a point between the overflow chamber 146 and the throttle 144". In accordance with the delivery rate of the injection pump 108', pressure variations are obtained in the conduit 113 between the overflow chamber 146 and the throttle 144" and are applied to the control apparatus 112. The pressure in the conduit 113 between the overflow chamber 146 and the throttle 144" will drop at a high delivery rate of the injection pump 108 and will rise at a low delivery rate.

Figure 5:
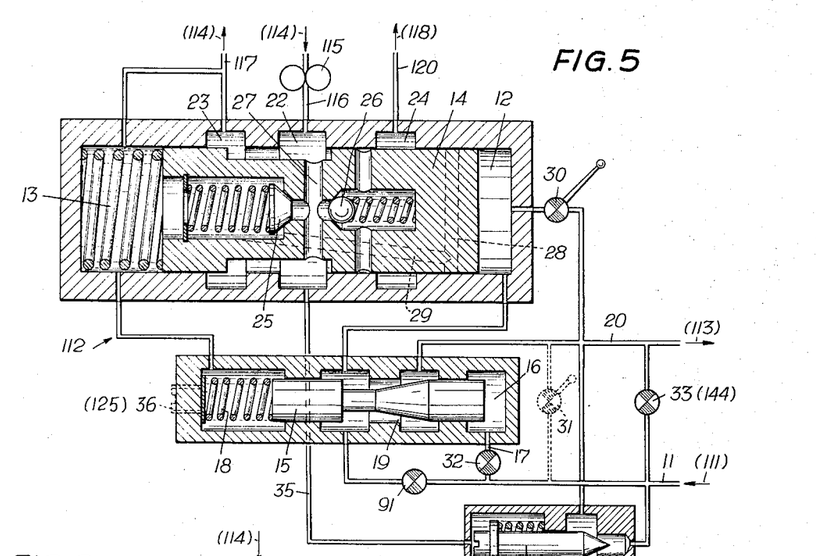
FIGS. 5, 6 and 7 are diagrammatic views showing different embodiments of the control apparatus.
Figure 6:
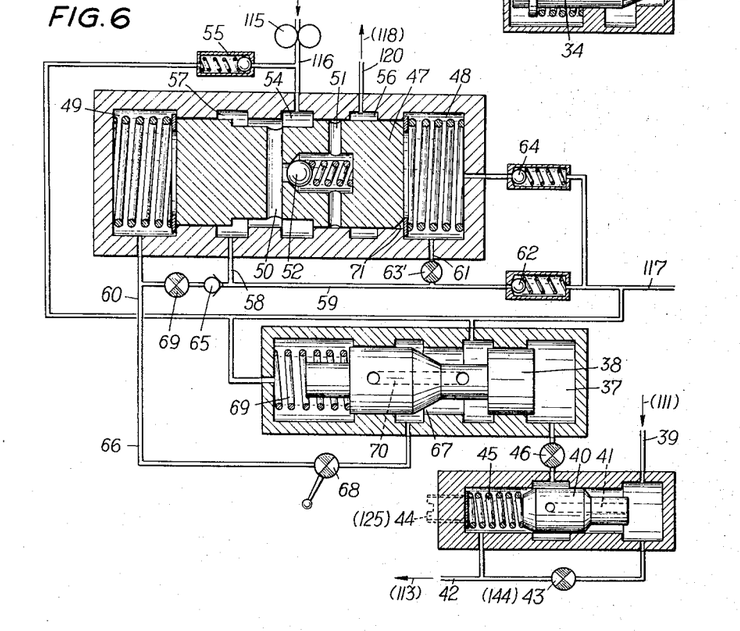
Figure 7:
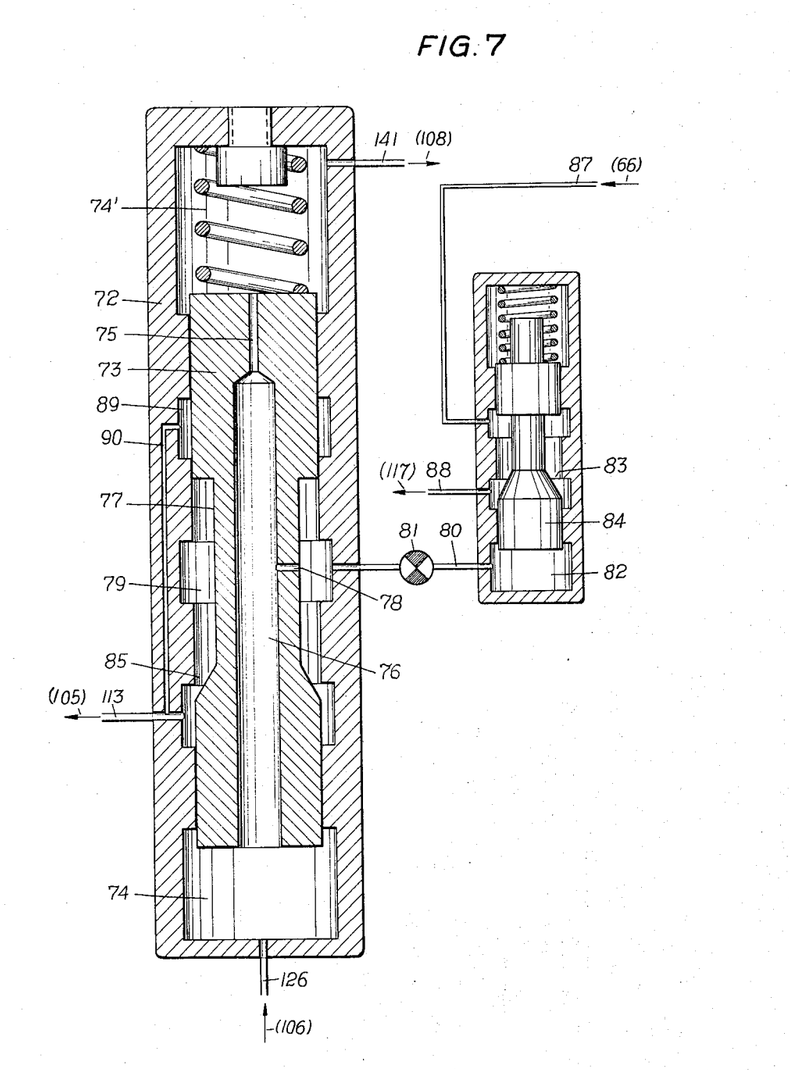

The pressure variations are applied through the conduit 111 to the control apparatus 112 and this varying pressure is admitted in the apparatus 112 to a pressure-controlled piston, which controls the hydraulic system liquid. In the control apparatus 112, these pressure variations may be utilized as shown in FIGS. 5, 6 and 7, which show only the control apparatus 112 and the throttle 144, 144' or 144". In the embodiment shown in FIG. 5, the fuel supplied through the conduit 111 to the control apparatus 112 flows through a conduit 11, which is connected to the conduit 111, to the working chamber 12 adjacent to a control piston 14, which is biased by a spring 13 towards this working chamber. The conduit 11 incorporates an auxiliary piston 15. The working chamber 16 adjacent to this auxiliary piston admits fuel under pressure from a conduit 17, which is branched from the conduit 11. The auxiliary piston 15 is biased towards the working chamber 16 by a spring 18. The spring stress of this spring is adjustable by a screw 36, which corresponds to the screw 125 in FIG. 1. The auxiliary piston 15 controls the area of a throttle 19, through which a portion of the fuel is diverted through a return conduit 20, which is connected by the conduit 113 to the fuel tank.

The hydraulic system of the lifting gear of the plough comprises the hydraulic system pump 115, which consists preferably of a gear-type rotary pump and feeds the hydraulic system liquid from the tank 114 through a conduit 116 to a peripheral groove 22 formed in the control cylinder. A further peripheral groove 23 in the control cylinder communicates with the return conduit 117 leading to the tank 114, and a peripheral groove 24 in the control cylinder communicates through the conduit 120 with the working chamber 118 adjacent to the working piston 121 for the lifting gear of the plough. The control piston 14 incorporates a relief valve 25 and a check valve 26. These valves communicate with a diametral bore 27 in the control piston. The control piston has further bores 28 and 29. Fuel pressure is admitted to the working chamber 12 adjacent to the control piston 14. This working chamber communicates through a manual adjusting device 30, which operates a valve, to the return conduit 20 leading to the fuel tank. This manual adjusting device may be replaced or supplemented by a manual adjusting device 31, which operates a valve and is incorporated in a conduit which connects the supply conduit 11 and the return conduit 20. The valves operated by these manual adjusting devices may consist of throttle valves or shut-off valves or of a throttle valve and a shut-off valve connected in parallel. These manual adjusting devices 30 and 31 are operated by levers, one of which is indicated at 124 in FIG. 1.

The throttle 33 which is incorporated in the conduit which connects the supply conduit 11 and the return conduit 20 corresponds to the throttle 144 or 144" in FIGS. 2 and 4 and is dimensioned in dependence on the type of tractor to be used. As this throttle diverts a portion of the fuel which is supplied, the pressure in the conduit 11 is a direct measure of the injection rate.

This apparatus functions as follows:

When a harder soil, an uphill movement or an increased ground friction results in an increase of the fuel consumption of the fuel-injecting, internal-combustion engine of the tractor, the injection pump 108 will deliver fuel to the injection nozzles 143 at a higher rate so that there will be a pressure drop in the conduit 111 and in the conduit 11 connected to its and in the working chamber 12 adjacent to the pressure-controlled control piston 14, which is then displaced to the right under the force of the spring 13. This movement interrupts the connection between the peripheral grooves 22 and 23 and establishes a communication from the peripheral groove 22 through the bore 27 and the check valve 26 to the peripheral groove 24, which communicates with the working chamber 118 of the working cylinder 119 for the lifting mechanism. As a result, the hydraulic system pump 115 does no longer feed into the return conduit but to the working chamber 118 of the working cylinder 119 so that the plow is lifted. This lifting of the plow is continued until the pressure in the working chamber 12 adjacent to the control piston rises and the piston is displaced to the left against the pressure of the spring 13 and assumes the neutral position shown in the drawing. When the manual adjusting device 30 or 31 operates a shut-off valve, the opening of this valve results in a complete pressure relief in the working chamber 12 adjacent to the control piston 14 so that the plough is permanently lifted off, e.g., for road travel. In order to prevent a pressure relief in the suction chamber of the injection pump as a result of a complete pressure relief in the working chamber 12, the supply conduit 11 incorporates a throttle 91. When the manual adjusting device 30 or 31 operates a throttle valve, it may be used to adjust the desired load range, e.g. the depth of penetration of the plough under certain soil conditions. This adjustment of the desired load range may alternatively be effected by a change of the initial stress of the spring 18 by means of the screw 36, which corresponds to the screw 125 in FIG. 1, so that the neutral-position area of the throttle 19 controlled by the auxiliary piston 15 can be changed.

As has been mentioned hereinbefore, the fuel under pressure is also admitted to the working chamber 16 adjacent to the auxiliary piston 15, which controls the area of a throttle 19 for deriving a portion of the fuel fed to the working chamber 12 adjacent to the control piston 14 to the fuel tank 105. A drop of the fuel pressure will permit the force of the spring 18 to displace auxiliary piston 15 to the right so that the area of the throttle and the fuel diverson rate is increased. Thus, large pressure variations in the conduit 11 will result in high pressure variations in the working chamber 12, which ensure a satisfactory and sufficient displacement of the control piston 14. The conduit 17 leading to the working chamber adjacent to the auxiliary piston 15 may incorporate an adjustable throttle 32, which controls the response rate of the control apparatus. When this throttle is incorporated, the control apparatus will not respond to small variations in the hardness of the soil. Such a response could result in an oscillatory motion of the lifting mechanism of the plough.

The conduit 11, which is connected to the conduit 111 branched off from the suction chamber or overflow chamber of the injection pump communicates through a throttle valve 34 with the return conduit 20, which is connected by the conduit 113 to the fuel tank 105. This throttle valve 34 is subjected to an opening spring bias and through a conduit 35, which opens into the peripheral groove 22, admits pressure from the hydraulic system which controls the lifting movement of the plough. When the hydraulic system pump 115 discharges into the return conduit, the conduit 35 will be pressure-relieved and the throttle valve 34 will be opened so that a portion of the fuel will be diverted from the supply conduit 11 or 111 directly into the return conduit 20 or 113. When the hydraulic system pump 15 discharges into the working chamber adjacent to the working cylinder for the lifting movement of the plough, the throttle valve is subjected to the pressure of the hydraulic system so that the diversion of a portion of the fuel from the supply conduit 11 or 111 to the return conduit 20 is prevented. The additional consumption of the internal-combustion engine caused by the operation of the hydraulic system pump 115 against a back pressure is compensated by this throttle valve 34.

When the soil conditions permit of a larger depth of penetration of the plough, i.e. when the internal-combustion engine with fuel injection is not utilized in accordance with the setting of the throttle, the pressure in the conduit 111 and in the working chamber 12 adjacent to the control piston and in the working chamber 16 adjacent to the auxiliary piston will rise. The rise of pressure in the working chamber 16 of the auxiliary piston closes the area of the throttle 19 so that the full pressure acts now on the control piston 14, as no portion of the fuel is being diverted through the throttle 19 of the auxiliary piston 15. The control piston 14 is displaced to the left against the spring force so that the peripheral groove 24 is connected to the return conduit 117 by the bores 28 and 29 in the control piston. This results in a pressure relief of the working piston 121 for the lifting movement of the plough so that the weight of the plough can cause the same to penetrate to a larger depth into the soil. This descent continues until the power of the internal-combustion engine with fuel injection is increased and the pressure in the working chamber adjacent to the control piston is correspondingly reduced so that the control piston has returned to the neutral piston shown in the drawing. In this neutral position, the control piston 14 closes the peripheral groove 24 so that hydraulic system liquid is neither supplied to nor discharged from the working chamber adjacent to the working cylinder for the lifting gear of the plough, and the plough remains in its position.

FIG. 6 shows the control apparatus according to the invention in an embodiment in which fuel pressure is admitted only to the working chamber 37 adjacent to an auxiliary control piston 38, which is biased towards the working chamber 37 by a spring 69. In this case, the fuel is supplied through a supply conduit 39, which is connected to the conduit 111. In order to ensure a satisfactory seal between the fuel system and the hydraulic system, the auxiliary control piston 38 may be covered or replaced by a diaphragm.

The supply conduit 39 incorporates an auxiliary piston 40, the face of which also admits the fuel pressure. This auxiliary piston 40 is biased by a spring 45. The stress of this spring can be adjusted by a screw 44. The auxiliary piston 40 controls the area of a throttle, through which a portion of the fuel is diverted to the fuel tank 105 through a return conduit 42, which is connected to the conduit 113. This auxiliary piston 40 has the same function as the auxiliary piston 15 in the embodiment shown in FIG. 5 so that small pressure variations in the conduit 39 result in large pressure differences in the working chamber 37. This will again ensure a satisfactory and sufficient displacement of the auxiliary control piston 38. Through a bore 41 in the piston 40, the supply conduit 39 communicates permanently with the working chamber 37 adjacent to the auxiliary control piston 38. This bore 40 constitutes a throttle bore, which prevents a pressure relief in the suction chamber of the injection pump in response to a pressure relief in the working chamber 37.

A throttle 43 is incorporated in a conduit, which connects the supply conduit 39 and the return conduit 42. This throttle 43 corresponds to the throttle 144 or 144" in FIGS. 2 and 4 and is dimensioned in dependence on the type of tractor which is used. The supply conduit 39 incorporates further an adjustable throttle 46, which like the throttle 32 in FIG. 5 controls the response rate of the control apparatus.

The control piston 47 is spring-biased at both ends and has two diametral bores 50 and 51, which are interconnected by a check valve 52. The hydraulic system liquid is supplied by the hydraulic pump 115 through conduit 116 to a peripheral groove 54 formed in the control cylinder. A relief valve 55 is connected to the return conduit 117. Another peripheral groove 56 in the control cylinder communicates through conduit 120 with the working chamber 118 of the working cylinder 119 of the lifting mechanism of plough. The peripheral groove 57 in the control cylinder communicates through conduits 58, 59, 60 and 61 with the two working chambers 48 and 49 adjacent to the control piston 47. The pressure in the conduits 58 and 59 is limited to a predetermined value by a pressure-holding valve 62 and the pressure in the working chamber 48 is limited to a predetermined value by a pressure holding valve 64. The two pressure-holding valves 62 and 64 are so adjusted that a higher pressure can build up in the conduit 59 than in the working chamber 48. Throttles 63 and 63' are provided to enable a build-up of mutually independent pressures in the two working chambers 48 and 49 of the control cylinder. A non-return valve 65 is arranged in the conduit 59.

A conduit 66, which incorporates a throttle 67 controlled by the auxiliary control piston 38, connects the working chamber 49 adjacent to the control piston to the return conduit 117 for the hydraulic system liquid. The conduit 66 incorporates further a manual adjusting device 68 for operating a valve. When the manual adjusting device 68 operates a shut-off valve, the closing of this shut-off valve will result in a sudden pressure rise in the working chamber 49 to lift the plough out of the soil, for instance, for road travel, as will be explained hereinafter. If the manual adjusting device 68 operates a throttle valve, the latter may be adjusted to a certain area to determine the value of the pressure drop in the working chamber and with it the depth of penetration of the plough. This manual adjusting device 68 is operated by a lever indicated at 124 in FIG. 1. Besides, the initial stress of the spring 45 may be adjusted by the screw 44 to adjust the desired load range.

The auxiliary control piston 38 has a bore 70, which consistitutes an overload safety device.

The apparatus shown in FIG. 6 has the following mode of operation: When the control piston 47 is in the neutral position shown on the drawing, the pressures in the two working chambers 48 and 49 are equal. As the pressure-holding valve 64 maintains a constant value in the working chamber 48, the throttle 67 controlled by the auxiliary control piston 38 must be opened so that the pressure prevailing in the working chamber 48 is obtained also in the working chamber 49, provided that the springs have the same characteristics. If a harder soil or the like results in an increase of the power requirement of the internal-combustion engine with fuel injection, so that there is a pressure drop in the conduit 111 branched from the suction chamber or overflow chamber of the injection pump, or in the supply conduit 39 and in the working chamber 37 adjacent to the auxiliary control piston 38, the spring 69 will displace the auxiliary control piston 38 to the right to close the throttle 67. This results in a pressure rise in the working chamber 49 adjacent to the control piston 47 to the pressure in the conduit 59 so that the control piston 47 is displaced to the right. By this displacement, the peripheral groove 57 is closed and the peripheral groove 54 is connected by the radial bore 50, the check valve 52 and the radial bore 51 to the peripheral groove 56, which communicates through conduit 120 with the working chamber 118 adjacent to the working piston 121 of the lifting mechanism of the plough. The hydraulic system pump is now discharging into the working chamber adjacent to the working piston of the lifting mechanism of the plough to lift the latter. When the peripheral groove 57 has been closed, hydraulic system liquid enters no longer the conduit 59 so that the pressure in this conduit drops to the pressure which prevails in the working chamber 48 and is held by the pressure holding valve 64. The non-return valve 65 prevents an adjustment of the pressure in the working chamber 49 to this value so that the pressure in this working chamber is maintained until a pressure rise in the working chamber 37 adjacent to the auxiliary control piston 38 opens the throttle 67. Now the control piston is displaced to its neutral position shown in the drawing and the lifting operation is thus terminated. If an obstacle, such as a root, a stone or the like, prevents a lifting of the plough, the injection pump will assume for a short time an overload condition so that the pressure in the working chamber 37 continues to drop and the displacement of the auxiliary control piston 38 to the right is continued until the conduit 66 is connected to the return conduit 117 by the bore 70 of the auxiliary control piston 38. This overload safety feature will then result in a reversal of pressure at the left-hand end of the control piston so that the lifting mechanism is lowered and the wheels are running free.

When the power of the internal-combustion engine with fuel injection is not fully utilized, so that the plow may be lowered further into the ground, the pressure in the suction chamber or overflow chamber of the injection pump and consequently in the working chamber 37 of the auxiliary control piston 38 will rise so that the throttle 67 is further opened. This results in a pressure drop in the working chamber 49 adjacent to the control piston 47, which is then displaced to the left until the peripheral groove 56 is exposed by the inclined edge 71 of the control piston. As a result, the working chamber 118 of the working cylinder 119 is pressure-relieved so that the weight of the plough causes the same to penetrate to a larger depth into the ground until the pressure in the working chamber 37 adjacent to the auxiliary control piston 38 drops to some extent and causes a reduction of the area of the throttle 67. This results in a pressure rise in the working chamber 49 adjacent to the control piston 47, which returns to its neutral position.

FIG. 7 shows a control apparatus which may be applied to single-flow injection pumps in the arrangement shown in FIG. 3 and in which the throttle indicated at 144′ in FIG. 3 is incorporated in the pressure-controlled piston itself. In this case, the fuel flows from the fuel pump 106 through the conduit 126 (FIG. 3) into one working chamber 74 adjacent to a pressure-controlled piston 73 and further through a bore 76, which is formed in the piston 73 and continued by a throttle bore 75, into the other working chamber 74′. This working chamber accommodates a spring, which biases the piston 73. The throttle bore 75 corresponds to the throttle indicated at 144′ in FIG. 3. Fuel is supplied from the working chamber 74′ to the suction chamber 141 of the injection pump 108. The working chamber 74 is subjected to the fuel pump pressure, which acts on the piston 73 against the force of the spring. The pressure in the working chamber 74′ varies in accordance with the variation of the delivery rates of the injection pump. These pressure variations in the chamber 74′ effect the control movement of the piston 73. The piston 73 has a control groove 77, which communicates through a radial bore 78 with the axial duct 76. The cylinder 72 is provided with a peripheral groove 79, which is connected to the working chamber 82 adjacent to an auxiliary control piston 84 by a conduit 80, which incorporates preferably an adjustable throttle 81 for controlling the response rate. A certain portion of the fuel flowing through the peripheral groove 79 to the working chamber 82 adjacent to the auxiliary control piston 84 is diverted through a throttle 85, which is controlled by the piston 73, through the conduit 113 leading to the fuel tank 105, so that there are pressure variations in the working chamber 82 adjacent to the auxiliary control piston 84.

The auxiliary piston 84 is connected, e.g., by the conduit 87, to the conduit 66 and the working chamber 49 adjacent to the control piston shown in FIG. 6 and controls the throttle 83, through which the hydraulic liquid in the working chamber 49 is diverted to the return conduit 88.

When the injection rate is increased as a result of an increased power requirement of the internal-combustion engine with fuel injection, there will be a pressure drop in the working chamber 74′ adjacent to the pressure-controlled piston 73 so that the piston 73 is displaced towards this working chamber. This movement closes the throttle 85 through which a portion of the fuel admitted to the auxiliary control piston 84 is diverted to the fuel tank 105, so that there is a pressure rise in the working chamber 82. This pressure rise results in the closing of the throttle 83 and consequently in a pressure rise in the working chamber 49 (FIG. 6) so that the plough is lifted off. On the other hand, when the power of the internal-combustion engine with fuel injection is not fully utilized, there will be a pressure rise in the working chamber 74′ so that the throttle 85 will be further opened and the working chamber 82 adjacent to the auxiliary control piston 84 will be pressure-relieved. This results in an opening of the throttle 83 which controls the discharge of hydraulic system liquid from the working chamber 49 (FIG. 6), so that the working chamber 49 is also pressure-relieved and the plough is lowered. In the neutral position of the pressure-controlled piston 73, the throttle 85 is opened to such an extent that a certain portion of the fuel admitted to the auxiliary control piston 84 is diverted through conduit 113 to the tank 105. The basic setting of the selected load range may be varied by a change of the initial stress of the spring which biases the pressure-controlled piston 73 so that the area of the throttle 85 differs from that in the neutral position of the piston 73. A duct 90 connects a peripheral groove 89 in the cylinder 72 to the conduit 113 leading to the tank 105 and constitutes also an overload safety feature, which is similar in operation to the overload safety feature described with reference to FIG. 6. When the plough cannot be lifted, the injection pump assumes for a short time an overload condition and the pressure-controlled piston 73 is lifted further to connect the peripheral groove 79 to the peripheral groove 89 so that there is a reversal of pressure in the working chamber 82 adjacent to the auxiliary control piston 84.

What I claim is:

1. In a method for regulating the depth of penetration of a hydraulically controlled plough drawn by a tractor having an internal-combustion engine with fuel injection including an injection pump having a fuel carrying chamber, in dependence on the applied tractive power of the tractor and plough moving means operable to lift and to lower said plough, the steps comprising selecting a predetermined fuel delivery rate, sensing the pressure change in said fuel carrying chamber, and transmitting said sensed pressure change to said plough moving means, whereby, an increase of the tractive power will result in a control of the movement of the plough in the lifting sense and a decrease of the tractive power in a movement of the plough in the lowering sense.

2. In a method according to claim 1, said pump being a single-flow injection pump having a by-pass control, said fuel carrying chamber being a suction chamber, the step of throttling the discharge of amount of fuel available to said suction chamber, thereby obtaining increased pressure variations, for controlling the movement of said plough in dependence on the pressure in said suction chamber.

3. Apparatus according to claim 21, comprising a single-flow injection pump and a feeder, which supplies the fuel through a transfer conduit to the suction chamber of the injection pump, characterized in that the throttle is incorporated in a return conduit, which is connected to the transfer conduit and serves for discharging the surplus fuel delivered by the feeder, the working chamber adjacent to the pressure-controlled piston being connected to the fuel-conducting space between the suction chamber and the throttle.

4. Apparatus according to claim 3, characterized in that an additional throttle is interposed in the transfer conduit between the feeder and the connection of the working chamber adjacent to the pressure-controlled piston and before the connection of the return conduit.

5. Apparatus according to claim 22, comprising a dual-flow injection pump and a discharge conduit connected to the by-pass conduit, characterized in that the throttle is incorporated in the discharge conduit and the working chamber adjacent to the pressure-controlled piston communicates with the fuel-conducting space between the by-pass chamber and the throttle.

6. Apparatus according to claim 21, characterized in that the throttle is replaced by two throttles, namely, a fixedly adjustable throttle for matching the control apparatus to a basic setting and a throttle which is arbitrarily adjustable during operation and serves for an arbitrary change of the load range.

7. Apparatus according to claim 21, characterized in that the working chamber adjacent to the pressure-controlled piston is connected by an arbitrarily operable valve to the return conduit.

8. Apparatus according to claim 21, characterized in that the pressure-controlled piston constitutes a control piston for the hydraulic system of the lifting mechanism of the plough.

9. Apparatus according to claim 21, characterized in that the pressure-controlled piston constitutes an auxiliary control piston, which controls a pressure fluid for operating the control piston of the hydraulic system.

10. Apparatus according to claim 9, characterized in that the auxiliary control piston controls a throttle for relieving the pressure chamber for the pressure fluid.

11. Apparatus according to claim 9, characterized in that the supply conduit for the pressure fluid is connected to the pressure conduit for the hydraulic system.

12. Aparatus according to claim 9 characterized in that the supply conduit for the pressure fluid is connected to a fuel conduit, which is subjected to the pressure of the feeder.

13. Apparatus according to claim 21, characterized by an auxiliary piston, which has adjacent to it a working chamber admitting the fuel pressure used for controlling the pressure-controlled piston and which is biased by a spring towards said working chamber, said auxiliary piston controlling a throttle, which connects the working chamber adjacent to the pressure-controlled piston to the return conduit.

14. Apparatus according to claim 21, characterized in that an adjustable throttle for controlling the response rate is incorporated in the supply conduit leading to the working chamber of the pressure-controlled piston or the auxiliary piston.

15. Apparatus according to claim 21, characterized in that the working chamber adjacent to the pressure-controlled piston is connected to the return conduit by a throttle valve, which is controlled by the pressure in the hydraulic system for effecting the lifting movement of the plough, said throttle valve being arranged to close in response to a pressure rise in the hydraulic system.

16. Apparatus according to claim 21, characterized in that the throttle is incorporated in the pressure-controlled piston.

17. Apparatus according to claim 21, characterized in that the pressure-controlled piston or the auxiliary piston has a control recess, which causes a reversal from a lifting movement to a lowering movement of the plough when this piston is displaced to a position beyond the position corresponding to the maximum delivery rate of the injection pump.

18. In a method according to claim 1, said pump being a dual-flow injection pump, said fuel carrying chamber being a by-pass chamber, the step of throttling the discharge from said by-pass chamber and thereby obtaining increased pressure variations for controlling the movement of the plough in dependence on the pressure in said by-pass chamber.

19. In a method for regulating the depth of penetration of a hydraulically controlled plough drawn by a tractor having an internal combustion engine with fuel injection, in dependence on the applied tractive power of the tractor, an increase of the tractive power resulting in a control of the movement of the plough in the lifting sense, and, respectively, a decrease of the tractive power resulting in a movement of the plough in the lowering sense, said engine including a single-flow injection pump and a forepump, moving means operable for moving said plough, the steps comprising selecting a predetermined fuel delivery rate, sensing the flow speed change of the fuel delivered by said forepump, and transmitting the sensed flow speed change to said plough moving means.

20. In a method for regulating the depth of penetration of a hydraulically controlled plough drawn by a tractor having an internal combustion engine with fuel injection, in dependence on the applied tractive power of the tractor, an increase of the tractive power resulting in a control of the movement of the plough in the lifting sense, and, respectively, a decrease of the tractive power resulting in a movement of the plough in the lowering sense, said engine including a dual-flow injection pump, the steps comprising selecting a predetermined fuel delivery rate, sensing the flow speed of the fuel diverted out of said pump, and transmitting the sensed flow speed change to said plough moving means.

21. An apparatus, for use in regulating the depth of penetration of a hydraulically controlled plough drawn by a tractor having an internal combustion engine with fuel injection, comprising said engine including an injection pump with at least one pump cylinder and piston for feeding said fuel to said engine, said cylinder and piston defining an operating chamber, said pump defining an overflow chamber and by-pass conduit means connecting said overflow chamber with said operating chamber, means operable for controlling said by-pass conduit means, said overflow chamber having a discharge passage, throttle means disposed between said overflow chamber and said discharge passage, a hydraulic mechanism operable for lifting and, respectively, lower said plough, and means operable for controlling said hydraulic mechanism, said last named means comprising a cylinder and a pressure-controlled piston defining with said cylinder a working chamber interiorly communicating with said overflow chamber.

22. An apparatus, for use in regulating the depth of penetration of a hydraulically controlled plough drawn by a tractor having an internal combustion engine with fuel injection including an injection pump having at least one cylinder and piston defining an operating chamber and being operable for feeding fuel to said engine, means establishing a suction chamber, said engine taking in the fuel from said suction chamber, said suction chamber receiving surplus fuel diverted from said engine, conduit means establishing interior communication between said suction and operating chambers and delivering fuel to said suction chamber from a fuel source, a throttle actuatable for controlling the fuel flow within said conduit means, a hydraulic mechanism operable for lifting and, respectively, lowering said plough, and means operable for controlling said hydraulic mechanism, said last named means comprising a cylinder and a pressure-controlled piston defining with said cylinder a working chamber interiorly communicating with said suction chamber.

23. Apparatus according to claim 22, characterized in that the throttle is replaced by two throttles, namely, a fixedly adjustable throttle for matching the control apparatus to a basic setting and a throttle which is arbitrarily adjustable during operation and serves for an arbitrary change of the load range.

24. Apparatus according to claim 25, characterized in that the working chamber adjacent to the pressure-controlled piston is connected by an arbitrarily operable valve to the return conduit.

25. Apparatus according to claim 22, characterized in that the pressure-controlled piston constitutes a control piston for the hydraulic system of the lifting mechanism of the plough.

26. Apparatus according to claim 22, characterized in that the pressure-controlled piston constitutes an auxiliary control piston, which controls a pressure fluid for operating the control piston of the hydraulic system.

27. Apparatus according to claim 22, characterized by an auxiliary piston, which has adjacent to it a working chamber admitting the fuel pressure used for controlling the pressure-controlled piston and which is biased by a spring towards said working chamber, said auxiliary piston controlling a throttle, which connects the working chamber adjacent to the pressure-controlled piston to the return conduit.

28. Apparatus according to claim 22, characterized in that an adjustable throttle for controlling the response rate is incorporated in the supply conduit leading to the working chamber of the pressure-controlled piston or the auxiliary piston.

29. Apparatus according to claim 22, characterized in that the working chamber adjacent to the pressure-controlled piston is connected to the return conduit by a throttle valve, which is controlled by the pressure in the hydraulic system for effecting the lifting movement of the plough, said throttle valve being arranged to close in response to a pressure rise in the hydraulic system.

30. Apparatus according to claim 22, characterized in that the throttle is incorporated in the pressure-controlled piston.

31. Apparatus according to claim 22, characterized in that the pressure-controlled piston or the auxiliary piston has a control recess, which causes a reversal from a lifting movement to a lowering movement of the plough when this piston is displaced to a position beyond the position corresponding to the maximum delivery rate of the injection pump.

References Cited
UNITED STATES PATENTS

| | | | |
|---|---|---|---|
| 2,629,306 | 2/1953 | Rusconi | 172—2 |
| 2,790,365 | 4/1957 | Bunting | 172—2 |
| 3,062,301 | 11/7962 | Pumper | 172—2 |
| 3,064,371 | 11/1962 | Kutzler | 172—2 |

ABRAHAM G. STONE, Primary Examiner.

WILLIAM A. SMITH III, Examiner.

J. R. OAKS, Assistant Examiner.